(12) United States Patent
Tanimoto et al.

(10) Patent No.: US 6,889,544 B2
(45) Date of Patent: May 10, 2005

(54) THERMAL TYPE FLOW RATE DETECTOR (75) Inventors: Koji Tanimoto, Tokyo (JP); Naruki Suetake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 297 days.

(21) Appl. No.: 10/441,054

(22) Filed: May 20, 2003

(65) Prior Publication Data

US 2004/0040377 A1 Mar. 4, 2004

(30) Foreign Application Priority Data

Aug. 29, 2002 (JP) ........................................ 2002-251188

(51) Int. Cl.[7] ................................................ G01F 1/68
(52) U.S. Cl. .................................................. 73/204.15
(58) Field of Search ......................... 73/204.15, 204.18, 73/204.11, 204.26

(56) References Cited

U.S. PATENT DOCUMENTS 5,965,813 A * 10/1999 Wan et al. ................ 73/204.26
6,349,596 B1 * 2/2002 Nakada et al. ........... 73/204.26
6,470,741 B1 * 10/2002 Fathollahzadeh ......... 73/204.15

FOREIGN PATENT DOCUMENTS

JP       10-500490 A    1/1998
JP       11-326003 A   11/1999

* cited by examiner

*Primary Examiner*—Edward Lefkowitz
*Assistant Examiner*—Jewel V. Thompson
(74) *Attorney, Agent, or Firm*—Sughrue Mion, PLLC

(57) ABSTRACT

A thermal type flow rate detector includes: a bridge circuit constructed by upstream side and downstream side temperature detecting elements for detecting a temperature of fluid flowing from the upstream side to the downstream side, and fixed resistors; and a temperature difference controlling circuit for continuously supplying an electric power to upstream side and downstream side heat generating elements so that a temperature difference between the temperature detecting elements becomes a predetermined value. The temperature difference controlling circuit includes: a differential amplifier connected to the bridge circuit; a first constant voltage power supply; a second constant voltage power supply having a lower constant voltage than that of the first constant voltage power supply; and the upstream side and downstream side heat generating elements.

6 Claims, 9 Drawing Sheets

THERMAL TYPE FLOW RATE DETECTOR

BACKGROUND OF THE INVENTION

1. Field of the Invention

The present invention relates in general to a thermal type current meter or a thermal type flow meter for detecting a flow velocity or a flow rate of gas or liquid, for example. In particular, the invention relates to a thermal type flow rate detector which is used to detect a quantity of air sucked into an engine for an automobile or the like as an example of application, and which is capable of enhancing the detection accuracy.

2. Description of the Related Art

In general, as for a flow rate detector for measuring a quantity of air sucked into an engine for an automobile, a thermal type one is generally used which can detect a mass flow rate, and which is excellent in cost performance. An engine sucks thereinto air on the basis of the reciprocating motion of a piston and increases or decreases a quantity of sucked air by opening or closing a throttle valve. The pulsation amplitude of air sucked into a 4-cylinder gasoline engine becomes larger as opening of the throttle valve is further increased and in a running state in which the engine becomes the full power, the air sucked there into becomes the pulsation flow entailing the countercurrent. Accordingly, for the accurate detection of a quantity of air sucked into an engine, there is required a flow meter which can detect the countercurrent as well.

As for a thermal type flow meter which can detect a countercurrent, as shown in Japanese Patent Laid-Open No. 10-500490, there has been put into practical use a temperature difference detection type in which a heat generating element is arranged on the surface side of a silicon substrate, and temperature detecting elements are arranged on the upstream side and on the downstream side with respect to the heat generating element, respectively, to detect a flow rate from the difference in temperature between the temperature detecting element on the upstream side and the temperature detecting element on the downstream side when the heat generating element is controlled at a fixed temperature. The temperature detecting element on the upstream side becomes lower in temperature than the temperature detecting element on the downstream side with respect to the flow direction. Thus, since the sign of the temperature difference is reversed between the fair current and the countercurrent, the countercurrent can be detected.

While the heat generating element and the temperature detecting elements are made so as to be of a diaphragm structure of reducing the heat capacity by using the fine patterning of silicon, since the mechanical strength is ensured, the necessary responsibility cannot be obtained and hence the detection accuracy becomes a problem depending on the engine and its running state. In addition, since an output signal depends on the temperature difference between the heat generating element and the temperature of the sucked air, the temperature difference adjustment of the fixed temperature controlling circuit is required every detector. Moreover, since there is required a temperature difference detecting circuit for detecting the temperature difference between the fixed temperature detecting circuit and the temperature detecting elements on the upstream and downstream sides, the circuit is difficult to be miniaturized.

On the other hand, the above-mentioned thermal type flow rate detector carries out the control so that the temperature of the sucked air and the temperature of the heat generating element become fixed, whereas in a thermal type flow rate detector shown in Japanese Patent No. 11-326003, two objects each having a heat generating element and a temperature detecting element are provided, and the measured temperature difference is kept to the value of zero by a control loop, and a signal based on the electric power supplied to the objects for complying with the aforesaid criterion in accordance with which the temperature difference must be zero is used as a flow rate signal.

Figure 8:
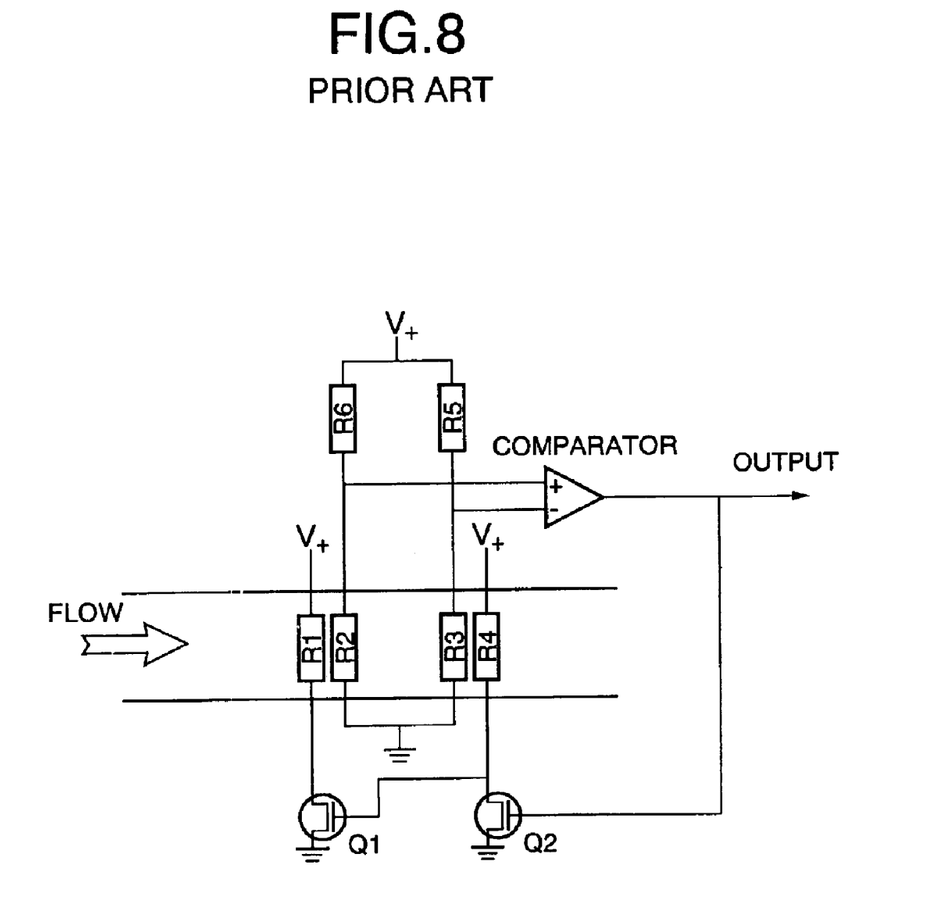
FIG. 8 is a circuit diagram showing a configuration of a conventional thermal type flow rate detector.

A conventional thermal type flow rate detector will herein below be described with reference to FIGS. 8 and 9. FIG. 8 is a circuit diagram showing a configuration of a conventional thermal type flow rate detector, and FIG. 9 is a view showing an arrangement of flow rate detecting elements of the conventional thermal type flow rate detector.

In FIG. 8, a bridge circuit is constructed by an upstream side temperature detecting element R2, a downstream side temperature detecting element R3, and fixed resistors R5 and R6. An output signal of the bridge circuit is inputted to a comparator. An output terminal of the comparator is connected to heat generating elements R1 and R4 through switching devices Q1 and Q2.

Figure 9:
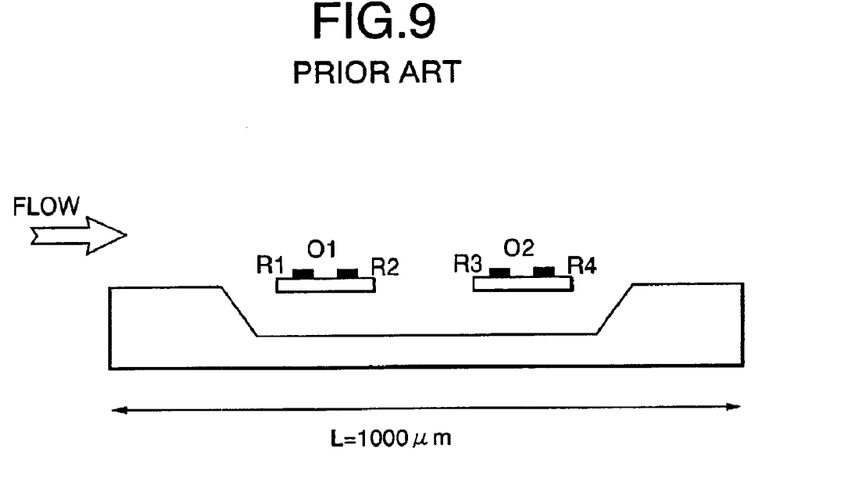
FIG. 9 is a view showing an arrangement of flow rate detecting elements of the conventional thermal type flow rate detector.

The upstream side temperature detecting element R2, the downstream side temperature detecting element R3, and the heat generating elements R1 and R4 are temperature sensitive type resistors, made of platinum, nickel or the like, for example, each resistance value of which is changed depending on the temperature, and are formed in the two objects O1 and O2 having a micro-bridge structure as shown in FIG. 9.

In the circuit configuration shown in FIG. 8, the upstream side heat generating element R1 and the downstream side heating generating element R4 are alternately heated so that the upstream side temperature detecting element R2 and the downstream side temperature detecting element R3 are balanced so as to get nearly the same temperature. For example, when the switching device Q1 is in the ON state, the upstream side heat generating element R1 is in the heating state, and the downstream side heat generating element R4 is in the non-heating state. When the temperature of the upstream side temperature detecting element R2 has risen by heating the upstream side heat generating element R1, the voltage appearing at a node between the fixed resistor R6 and the upstream side temperature detecting element R2 is increased, and when it becomes higher than that appearing at a node between the fixed resistor RS and the downstream side temperature detecting element R3, the level of an output signal from the comparator is inverted so that the switching device Q2 is turned ON and the switching device Q1 is turned OFF. Thus, the downstream side heat generating element R4 is heated so that the temperature of the downstream side temperature detecting element R3 is raised, while the temperature of the upstream side temperature detecting element R2 is lowered.

As described above, the electric power is intermittently and alternately supplied to the heat generating elements R1 and R4, whereby the upstream side temperature detecting element R2 and the downstream side temperature detecting element R3 are balanced so as to get nearly the same temperature. The duty ratio of a gate signal of the switching device Q1 becoming a drive signal for the upstream side heat generating element R1 becomes 50% when a flow rate is zero. Then, the duty ratio is further increased as the forward flow rate is larger, while it is reduced as the reverse flow rate is further increased. Thus, the duty ratio is monitored to allow the forward and reverse flow rates to be detected.

In the above-mentioned thermal type flow rate detector, unlike the conventional temperature difference detection system, an output signal hardly depends on the temperature of the heat generating element and becomes a function of only a flow rate. Thus, that detector has the merit that the temperature adjustment for the heat generating element becomes unnecessary. In addition, since the drive signal of the heat generating element feedback-controlled in the detection circuit is used as the flow rate signal, that detector has the advantage in that its responsibility is more speedy than that in the temperature difference detection system. However, if the ON resistance of the switching device for intermittently controlling the heat generating element varies depending on the temperature or the like, its output signal is also changed accordingly. In addition, the flow rate signal is mixed with the noise due to the switching operation, and in particular, when the flow rate sensitivity is low, the SN ratio becomes worse in some cases.

Moreover, since the output signal of the thermal type flow rate detector is the pulse signal, an interface circuit is required in some cases. In other words, in the case where the pulse signal is intended to be inputted to an analog-to-digital converter, a low-pass filter for converting the pulse signal to the analog voltage is required. Then, if an analog voltage having small ripple is intended to be obtained, the cut-off frequency of the low-pass filter needs to be set to a low frequency, and as a result, there is encountered a problem in that the responsibility becomes poor.

Figure 10:
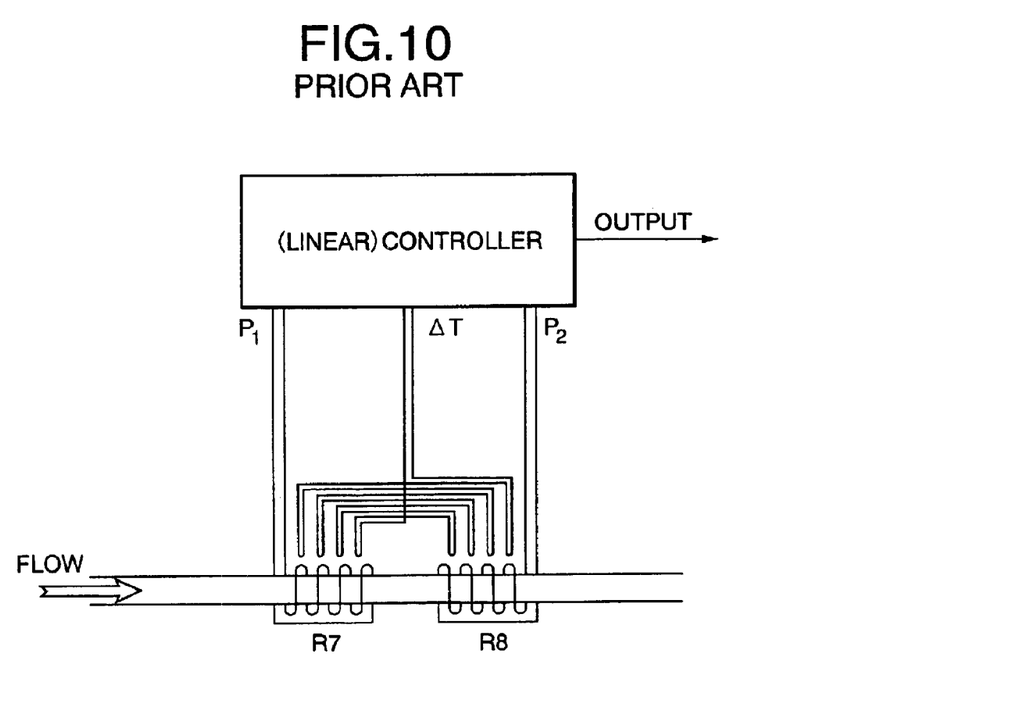
FIG. 10 is a view showing a configuration of another conventional thermal type flow rate detector.

In another conventional thermal type flow rate detector shown in FIG. 10, unlike the system for intermittently controlling the heat generating element as described above, heat generating elements R7 and R8 are provided in the outer periphery of a pipe line, and the temperature difference between the heat generating elements is detected using a thermo couple in a (linear) controller to control the heating of the heat generating elements R7 and R8 so that the level of an output signal of the thermo couple becomes zero. In Japanese Patent No. 11-326003, there is no description of the detailed circuit configuration of a (linear) controller. However, considering from other similar embodiments, the (linear) controller concerned is constructed by an analog-to-digital converter for converting the voltage from the thermo couple, a digital-to-analog converter for supplying a heating current to the heat generating elements R7 and R8, and a signal processing portion. While the thermal type flow rate detector shown in FIG. 10, unlike the thermal type flow rate detector shown in FIG. 8, can continuously control the heat generating elements, the circuit configuration is complicated and the miniaturization of the detector becomes difficult since the analog-to-digital converter, the digital-to-analog converter, and the signal processing portion are required.

In addition, in the arrangement of the temperature detecting elements and the heat generating elements as shown in FIG. 9, the upstream side heat generating element R1 is located on the upstream side with respect to the upstream side temperature detecting element R2. Thus, the thermal type flow rate detector shown in FIG. 9 has a problem in that the heat in the upstream side heat generating element R1 is received by the upstream side temperature detecting element R2 through the fluid to reduce the flow rate sensitivity.

As described above, the conventional flow rate detector for carrying out the control so that the temperature difference between the two temperature detecting elements located on the upstream side and on the downstream side respectively becomes zero to detect a quantity of electric power supplied to the heat generating elements at this time suffers the influence of the characteristics of the switching device for intermittently supplying therethrough the electric power to the heat generating elements, and also requires the analog-to-digital converter, the digital-to-analog converter, the signal processing portion and the like. As a result, there is encountered a problem in that the circuit configuration becomes complicated and the detector is difficult to be miniaturized.

Moreover, the temperature detecting elements and the heat generating elements formed in the two objects are arranged in the order of the upstream side heat generating element, the upstream side temperature detecting element, the downstream side temperature detecting element and the downstream side heat generating element from the fair current upstream side. Thus, there is encountered a problem in that the heat of the upstream side heat generating element is received by the upstream side temperature detecting element to reduce the flow rate sensitivity.

In addition, in the prior art, the influence when the fluid temperature is changed is not taken into consideration. As a result, there is encountered a problem in that when the air temperature is largely changed as in the air sucked into the automobile engine, there occurs the error in flow rate detection due to the difference between the temperature dependency of the heat transfer rate in the upstream side heat generating element and the temperature dependency of the heat transfer rate in the downstream side heat generating element.

SUMMARY OF THE INVENTION

In the light of the foregoing, the present invention has been made in order to solve the above-mentioned problems associated with the prior art, and it is therefore an object of the present invention to provide a thermal type flow rate detector which is capable of identifying a flow direction as well with a circuit configuration simplified more greatly than the conventional one and which is capable of obtaining a flow rate signal of an analog voltage excellent in SN ratio.

A thermal type flow rate detector according to the present invention includes: abridge circuit constructed by first and second temperature detecting elements for detecting a temperature of fluid flowing from the upstream side to the downstream side, and first and second fixed resistors; and a temperature difference controlling circuit for continuously supplying an electric power to first and second heat generating elements so that a temperature difference between the first and second temperature detecting elements becomes a predetermined value. Further, the temperature difference controlling circuit includes: a differential amplifier connected to the bridge circuit; a first constant voltage power supply; a second constant voltage power supply having a lower constant voltage than that of the first constant voltage power supply; and the first and second heat generating elements, and in the thermal type flow rate detector, the first heat generating element is connected between an output side of the differential amplifier and the second constant voltage power supply, and the second heat generating element is connected between the output side of the differential amplifier and the first constant voltage power supply.

As a result, there can be obtained such an effect that a flow direction can also be identified, and a flow rate signal of an analog voltage excellent in SN ratio can be obtained.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will herein after be described in detail with reference to the accompanying drawings.

First Embodiment

Figure 1:
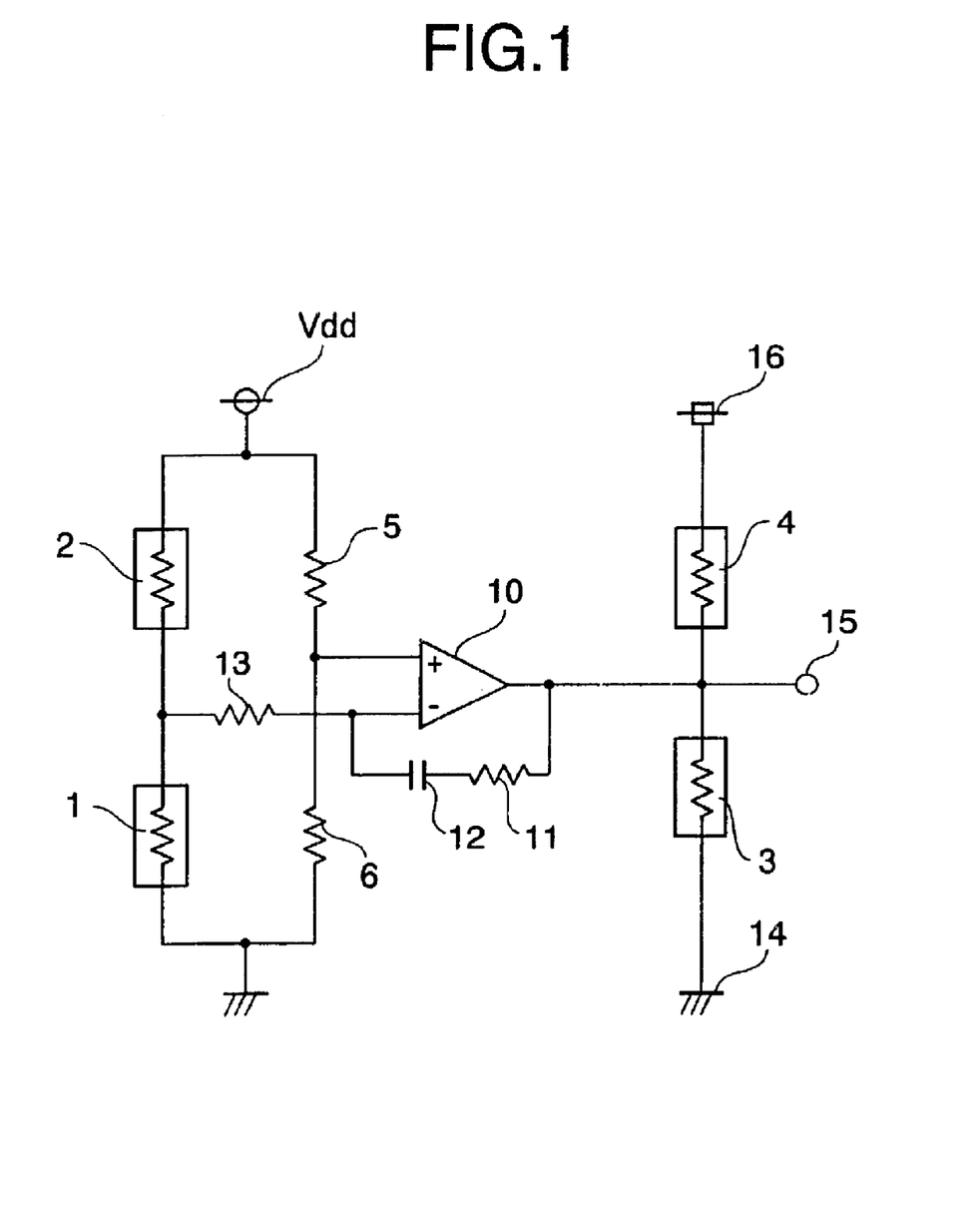
FIG. 1 is a circuit diagram showing a configuration of a thermal type flow rate detector according to a first embodiment of the present invention.

A thermal type flow rate detector according to a first embodiment of the present invention will hereinbelow be described with reference to FIGS. 1 to 3. FIG. 1 is a circuit diagram showing a configuration of a thermal type flow rate detector according to a first embodiment of the present invention. Note that, in the figures, the same reference numerals denote the same or corresponding constituent elements.

In FIG. 1, reference numeral 1 denotes an upstream side temperature detecting element; reference numeral 2 denotes a downstream side temperature detecting element; reference numeral 3 denotes an upstream side heat generating element; reference numeral 4 denotes a downstream side heat generating element; reference numeral 5 denotes a fixed resistor; reference numeral 6 denotes a fixed resistor; reference numeral 10 denotes a differential amplifier; reference numeral 11, a fixed resistor; reference numeral 12, a capacitor; reference numeral 13, a fixed resistor; reference numeral 14, a second constant voltage power supply; reference numeral 15, an output terminal; and 16, a first constant voltage power supply.

The upstream side temperature detecting element 1, the downstream side temperature detecting element 2, the fixed resistors 5 and 6, and the constant voltage power supply Vdd constitute a bridge circuit an output side of which is in turn connected to an input side of the differential amplifier 10.

The fixed resistor 13 connected between an inverting input terminal of the differential amplifier 10 and the bridge circuit, and the fixed resistor 11 and the capacitor 12 connected between the inverting input terminal of the differential amplifier 10 and the output terminal 15 constitute a phase compensation circuit performing a part of the phase compensation of the secondary delay system.

The downstream side heat generating element 4 and the upstream side heat generating element 3 are connected between the output side of the differential amplifier 10 and the first constant voltage power supply 16 and between the output side of the differential amplifier 10 and the second constant voltage power supply 14, respectively.

The second constant voltage power supply 14 is lower in electric potential than the first constant voltage power supply 16, and is connected to GND in this embodiment. The differential amplifier 10 has the function of supplying a current from its output side to the upstream side heat generating element 3 to suck the current from the first constant voltage power supply 16 to its output side through the downstream side heat generating element 4.

Note that a temperature difference controlling circuit is constructed by the differential amplifier 10, the phase compensation circuit, the upstream side heat generating element 3, the downstream side heat generating element 4, the second constant voltage power supply 14, and the first constant voltage power supply 16.

Figure 2:
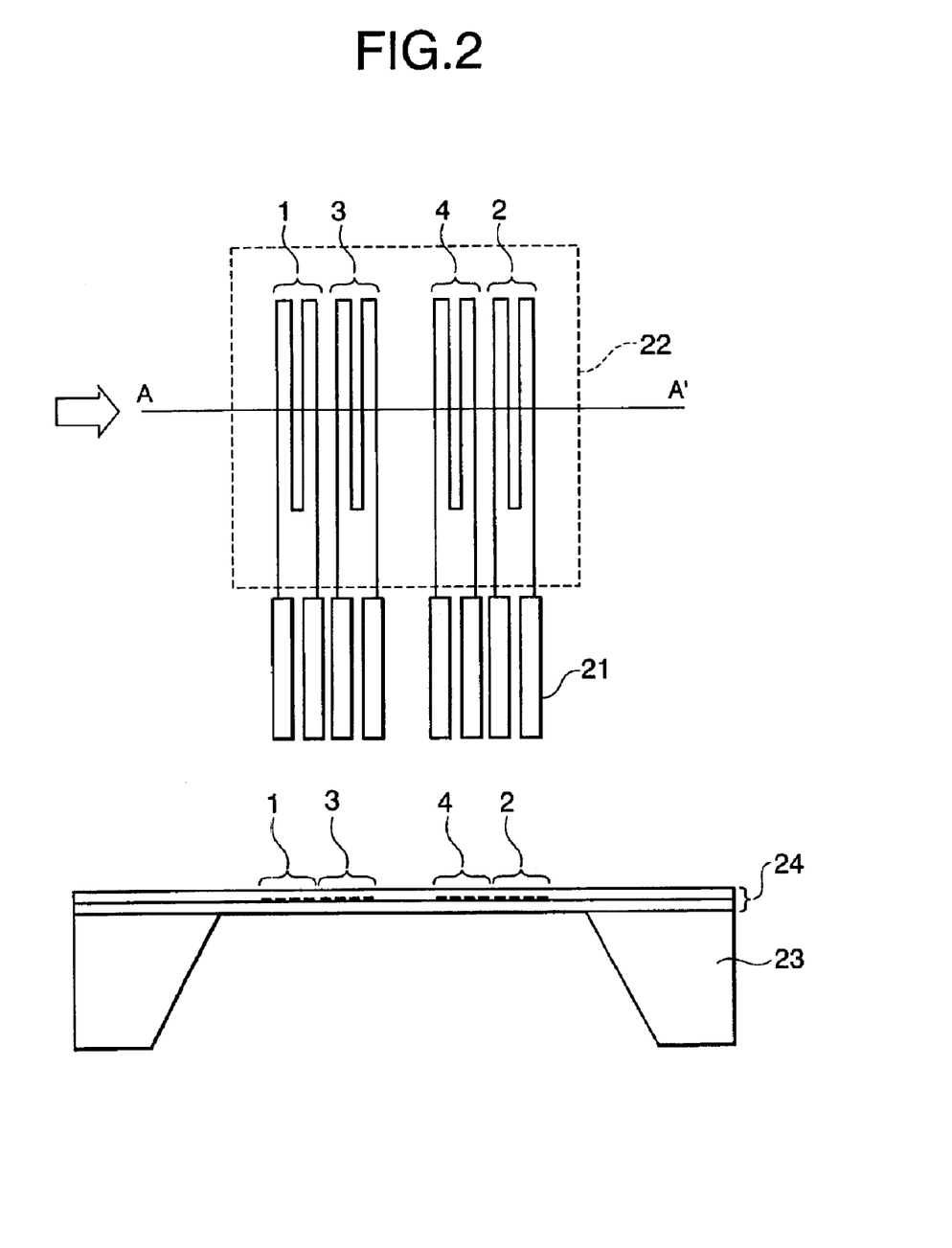
FIG. 2 is a view showing an arrangement of flow rate detecting elements of the thermal type flow rate detector according to the first embodiment of the present invention.

FIG. 2 is a plan view and a cross sectional view each showing an arrangement of flow rate detecting elements of the thermal type flow rate detector according to the first embodiment.

In FIG. 2, reference numeral 21 denotes an electrode. reference numeral 22 denotes a diaphragm, reference numeral 23 denotes a silicon substrate, and reference numeral 24 denotes an insulating film.

In a plan view in the upper row of FIG. 2, the temperature detecting elements 1 and 2, and the heat generating elements 3 and 4 are electrically connected to an external circuit through the electrodes 21. The upstream side temperature detecting element 1, the upstream side heat generating element 3, the downstream side heat generating element 4, and the downstream side temperature detecting element 2 are formed in this order from the upstream side perpendicularly to the flow direction, and each of them is constructed by a temperature sensitive resistor, made of a material such as platinum or nickel, the resistance value of which is changed depending on the temperature. Up to now, as shown in FIG. 9, the heat generating elements R1 and R4 are located on the upstream or downstream side with respect to the temperature detecting elements R2 and R3, whereas in this embodiment, it is the feature that the positional relationship between the heat generating elements 3, 4 and the temperature detecting elements 1, 2 is reversed.

In a cross sectional view taken along the line A—A of a plan view in the lower row of FIG. 2, for the purpose of reducing the heat capacity, a part of the rear face side of the silicon substrate 23 is removed by utilizing the etching to form the thin film diaphragm 22 in a flow rate detecting elements forming portion. In addition, the insulating film 24 is made of silicon nitride or silicon oxide with several $\mu$m thickness and serves to protect the temperature sensitive resistance film (flow rate detecting elements) from the upper and lower sides.

Next, the description will hereinbelow be given with respect to the operation of the thermal type flow rate detector according to the first embodiment with reference to FIGS. 1 to 4.

In the thermal type flow rate detector shown in FIG. 1, in the normal operation, the heating current is supplied to the heat generating elements 3 and 4 so that the voltage appearing at the inverting input terminal and the voltage appearing at the non-inverting input terminal of the differential amplifier 10 becomes nearly equal to each other. In other words, in the case where the two temperature detecting elements 1 and 2 are identical in the resistance-temperature characteristics to each other, and also the fixed resistors 5 and 6 are identical to each other, the temperature difference controlling circuit supplies the heating current from the first constant voltage power supply 16 and the differential amplifier 10 to the heat generating elements 3 and 4 so that the upstream side temperature detecting element 1 and the downstream side temperature detecting element 2 becomes identical in temperature to each other. As a result, the temperature detecting elements 1 and 2 are held at the same temperature.

If thermal characteristics of the temperature detecting element 1 and the temperature detecting element 2, and the heat generating element 3 and the heat generating element 4 as the flow rate detecting elements as shown in FIG. 2 are equal to each other with the upstream side and the downstream side, and also the resistance-temperature characteristics of the heat generating elements 3 and 4 are equal to each other, then when the flow rate is zero, the output signal of the differential amplifier 10 is at the middle electric potential between the first constant voltage power supply 16 and the second constant voltage power supply 14. If the forward flow rate is increased from this state, since the upstream side heat generating element 3 and the upstream side temperature detecting element 1 become larger in heat transfer rate than the downstream side heat generating element 4 and the downstream side temperature detecting element 2, the upstream side heat generating resistor requires a more quantity of calorification than the downstream side heat generating resistor requires. Thus, in order that the temperature difference between the upstream side temperature detecting element 1 and the downstream side temperature detecting element 2 may be held at zero, the upstream side heat generating element 3 is supplied with more the heating current than that with which the downstream side heat generating element 4 is supplied from the differential amplifier 10.

Figure 3:
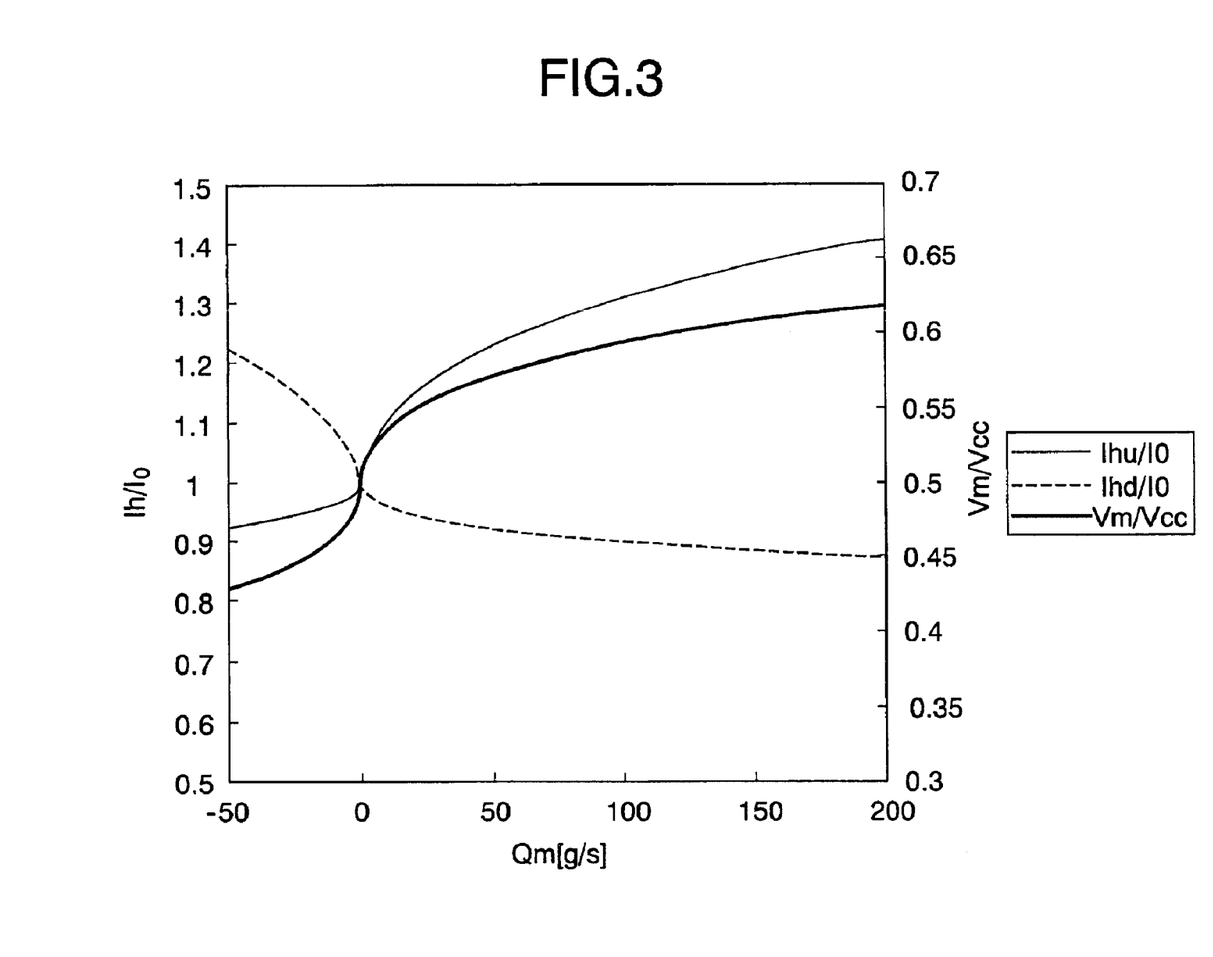
FIG. 3 is a graphical representation showing flow rate characteristics of the thermal type flow rate detector according to the first embodiment of the present invention.

FIG. 3 is a graphical representation showing the relationship between the flow rate for which the forward direction is defined as plus and the reverse direction is defined as minus, and a flow rate signal (Ih/I0, Vm/Vcc).

In FIG. 3, the axis of abscissa represents a flow rate (Qm), the left-hand side of the axis of ordinate represents a current ratio (Ih/I0), and the right-hand side of the axis of ordinate represents a voltage ratio (Vm/Vcc). In addition, Ihu represents a current in the upstream side heat generating element 3, Ihd represents a current in the downstream side heat generating element 4, and I0 represents a current when the flow rate is zero. Moreover, Vm represents a voltage appearing at the output terminal, and Vcc represents a voltage of the first constant voltage power supply 16.

Since when the flow rate (Qm) is zero, the relationship of Ihu=Ihd=I0, and Rhn (a resistance value of the upstream side heat generating element 3)=Rhd (a resistance value of the downstream side heat generating element 4) are established, the relationship of Ihu/I0=Ihd/I0=1.0, and Vm/Vcc=0.5 are established. If the forward flow rate is increased, then Ihu/I0 and Vm/Vcc are increased, while Ihd/I0, and (Vcc-Vm)/Vcc are decreased. Note that, since in the countercurrent, the upstream side temperature detecting element 1 and the upstream side heat generating element 3 are located on the downstream side with respect to the downstream side temperature detecting element 2 and the downstream side heat generating element 4, the above-mentioned dependency of the heating current on the flow rate is reversed. As shown in FIG. 3, the voltage Vm appearing at the output terminal 15 of the differential amplifier 10 shows the characteristics in which it monotonously increases with the flow rate over the range from the countercurrent region to the forward region. Thus, the relatively simple analog circuit shown in FIG. 1 is configured, and the voltage Vm or the voltage developed across the first constant voltage power supply 16 and the output terminal 15 is measured to allow the flow rate with respect to the region including the fair current region and the countercurrent region to be detected.

Figure 4:
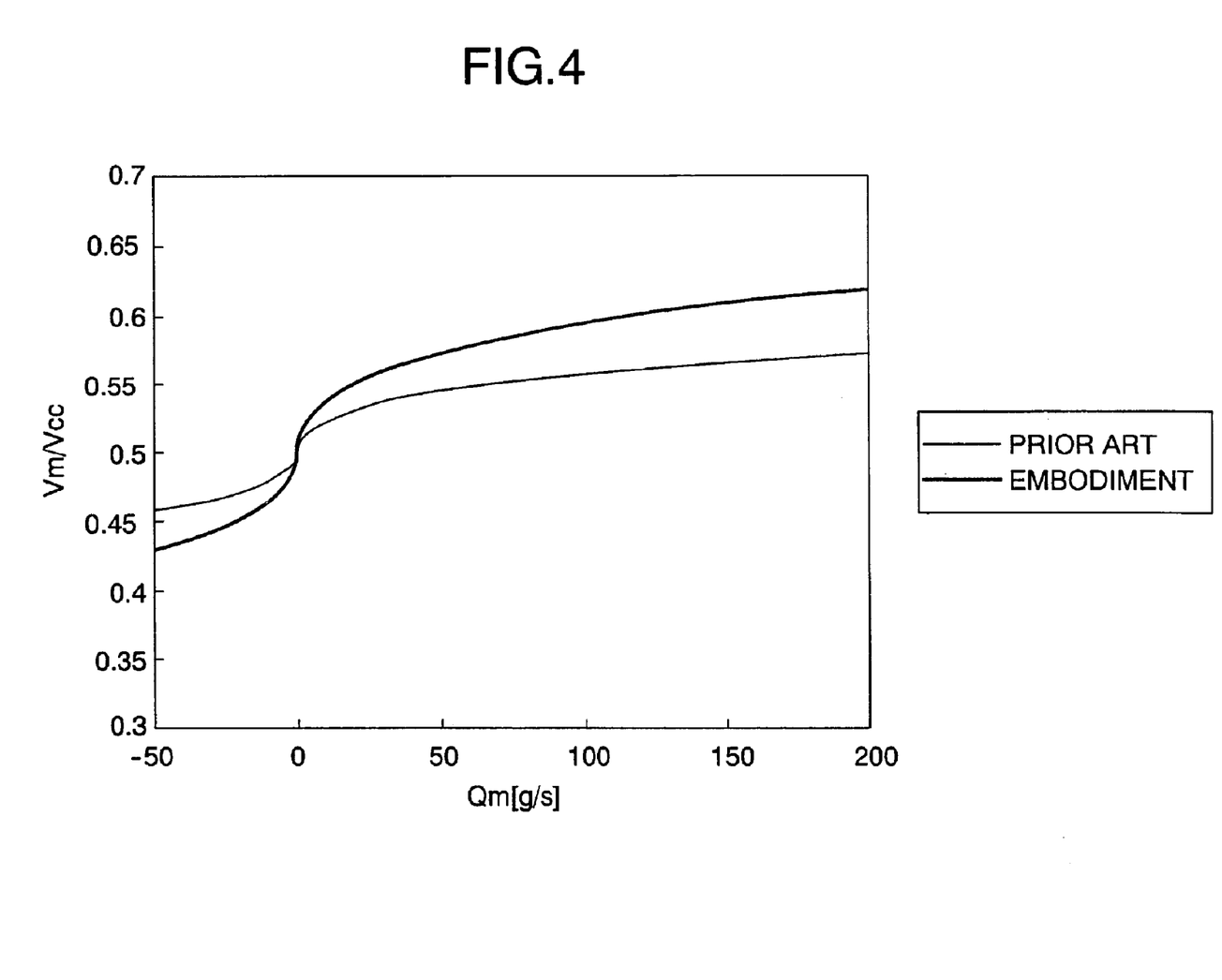
FIG. 4 is a graphical representation showing a comparison in flow rate characteristics between the thermal type flow rate detector according to the first embodiment of the present invention and a conventional thermal type flow rate detector.

FIG. 4 is a graphical representation showing a comparison in flow rate characteristics between the flow rate detecting elements (the temperature detecting elements and the heat generating elements) of this embodiment and the conventional flow rate detecting elements shown in FIG. 9 (the temperature detecting elements and the heat generating elements).

In FIG. 4, the axis of abscissa represents the flow rate (Qm), and the axis of ordinate represents the voltage ratio (Vm/Vcc).

Note that, in both the cases, the circuit shown in FIG. 1 is used. In the prior art, the heat generating elements R1 and R4 are located on the upstream or downstream side with respect to the temperature detecting elements R2 and R3. Thus, the heat of the upstream side heat generating element R1 is received by the upstream side temperature detecting element R2 to reduce the difference of the heat transfer rate between the upstream side heat generating element and temperature detecting element and the downstream side heat generating element and temperature detecting element. On the other hand, in the case of the flow rate detecting elements in this embodiment, since the upstream side temperature detecting element 1 is located on the upstream side with respect to the upstream side heat generating element 3, the flow rate detecting elements are free from the influence of reception of heat as found in the prior art. As a result, the difference of the heat transfer rate between the upstream side heat generating element and temperature detecting element and the downstream side heat generating element and temperature detecting element becomes large. Accordingly, the difference in heating current between the upstream side heat generating element 3 and the downstream side heat generating element 4 becomes large so that as shown in FIG. 4, the flow rate sensitivity of this embodiment is further increased than that of the prior art, and hence the characteristics excellent in detection accuracy can be obtained.

Note that, in the above-mentioned first embodiment, such a configuration is adopted that in FIG. 1, the resistance values of the fixed resistors 5 and 6 are set to the same value so that the two temperature detecting elements 1 and 2 becomes equal in temperature to each other. However, for example, the resistance value of the fixed resistor 6 is set larger than that of the fixed resistor 5, whereby the currents are caused to flow through the heat generating elements 3 and 4 so that the temperature of the upstream side temperature detecting element 1 becomes higher than that of the downstream side temperature detecting element 2 by fixed degrees.

Conversely, the resistance value of the fixed resistor 5 is set larger than that of the fixed resistor 4, whereby the currents are caused to flow through the heat generating elements 3 and 4 so that the temperature of the downstream side temperature detecting element 2 becomes higher than that of the upstream side temperature detecting element 1 by fixed degrees. In both the above-mentioned examples as well, the circuits show the same operation as that of the circuit of FIG. 1, and the voltage Vm or the voltage developed across the first constant voltage power supply 16 and the output terminal 15 is measured to allow the flow rate with respect to the region including the fair current region and the countercurrent region to be detected.

According to the first embodiment, the temperature difference control circuit can be configured only by a simple analog circuit without using an analog-to-digital converter, a digital-to-analog converter or the like.

In addition, since the upstream side temperature detecting element 1 is arranged so as to be located on the upstream side with respect to the upstream side heat generating element 3 to prevent the heat of the upstream side heat generating element 3 from being received by the upstream side temperature detecting element 1 through the fluid, the cooling effect provided by the fluid is enhanced to improve the flow rate sensitivity.

Second Embodiment

Figure 5:
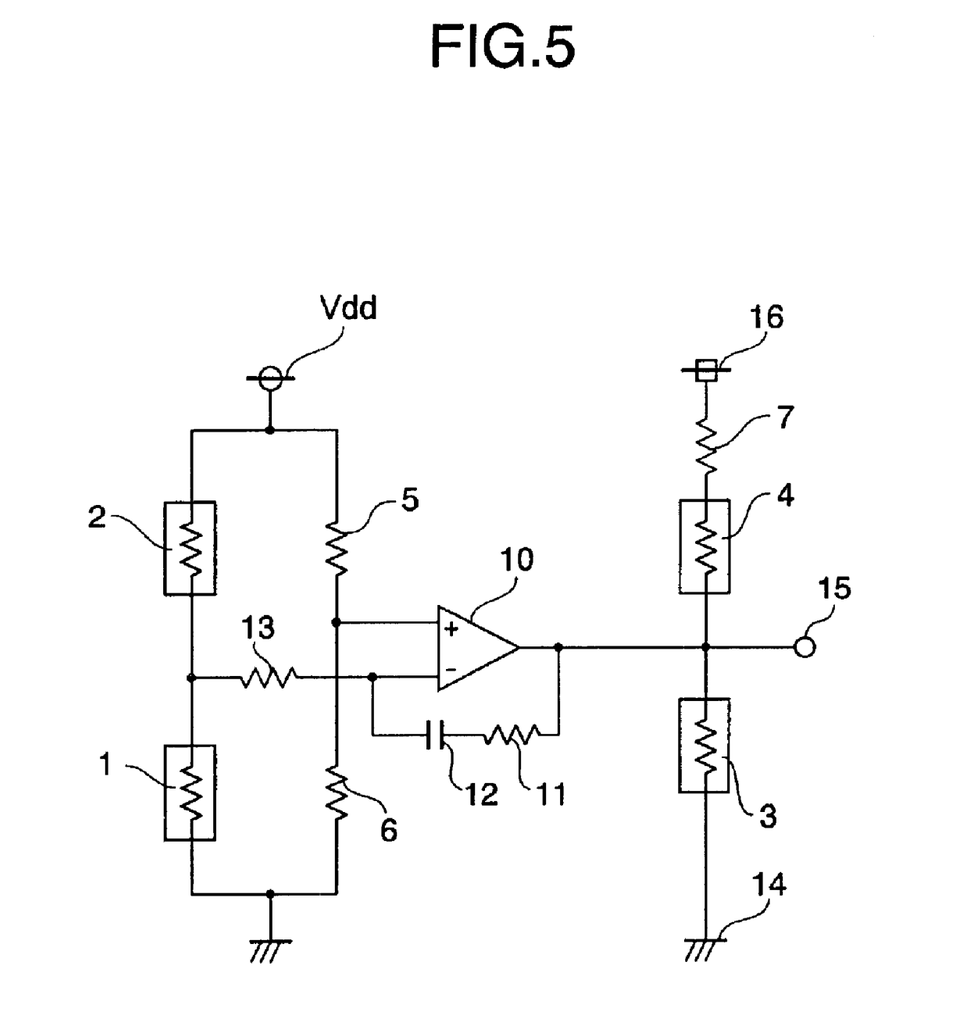
FIG. 5 is a circuit diagram showing a configuration of a thermal type flow rate detector according to a second embodiment of the present invention.

A thermal type flow rate detector according to a second embodiment of the present invention will hereinbelow be described with reference to FIGS. 5 and 6. FIG. 5 is a circuit diagram showing a configuration of a thermal type flow rate detector according to a second embodiment of the present invention.

In FIG. 5, both the circuit and the flow rate detecting elements are the same as those of the above-mentioned first embodiment shown in FIG. 1 except for a fixed resistor 7. The fixed resistor 7 is connected in series with the downstream side heat generating element 4 and between the downstream side heat generating element 4 and the first constant voltage power supply 16 or the output terminal 15.

Next, the description will hereinbelow be given with respect to the operation of the thermal type flow rate detector according to the second embodiment with reference to FIGS. 5 and 6.

In the case where temperature drift does not become a problem against the change in fluid temperature, the circuit configuration shown in FIG. 1 may be available. However, in the case where in particular, as in an automobile, the fluid temperature is changed from −30 degrees to the vicinity of +100 degrees, the temperature drift may become a problem in some cases. The relationship between a quantity of calorification and a quantity of heat radiation in the heat generating element is expressed by the following Expression (1).

$$RhIh^2 = (a + bQm^{0.5})(Th - Ta) \quad \text{(Expression 1)}$$

where Rh represents a resistance value of the heat generating element, Ih represents a current caused to flow through the heat generating element, Qm represents a flow rate, Th represents a temperature of the heat generating element, Ta represents a fluid temperature, and a and b represent constants independent of the flow rate. Moreover, the voltage Vm appearing at the output terminal 15 is expressed by the following Expression (2).

$$Vm = \{(a + bQm^{0.5})(Thu - Ta)Rhu\}^{1/2} \quad \text{(Expression 2)}$$

Here, a suffix u exhibits the upstream side heat generating element 3.

In FIGS. 1 and 5, when the flow rate Qm is fixed and the fluid temperature rises, the resistance value Rh of the heat generating element which has the positive temperature coefficient in resistance value and to which a fixed voltage is applied is increased and the temperature difference ($Th_u - Ta$) is decreased. In the circuit configuration of FIG. 1, the resistance values and the temperatures provided by the heat generation of the upstream side heat generating element 3 and the downstream side heat generating element 4 are similarly changed depending on the temperature. Thus, if the constants a and b have the same temperature dependency with the upstream side and the downstream side, then the voltage Vm is not changed and hence no temperature drift occurs. However, in general, the temperature coefficients of constants a and b on the upstream side shown in Expression (2) becomes smaller than those on the downstream side (Expression is omitted here). Accordingly, with the circuit configuration of FIG. 1, the level of the output signal is reduced at the high temperatures, and hence the minus temperature drift occurs.

In FIG. 5, the connection of the fixed resistor 7 reduces dependency of the voltage developed across the output terminal 15 and the first constant voltage power supply 16 on the fluid temperature. Thus, for example, when the fluid temperature rises, the voltage developed across the output terminal 15 and the second constant voltage power supply 14 is increased, while the voltage developed across the output terminal 15 and the first constant voltage power supply 16 is decreased. Accordingly, the resistance value of the fixed resistor 7 is suitably adjusted to allow the temperature drift to be reduced.

Figure 6:
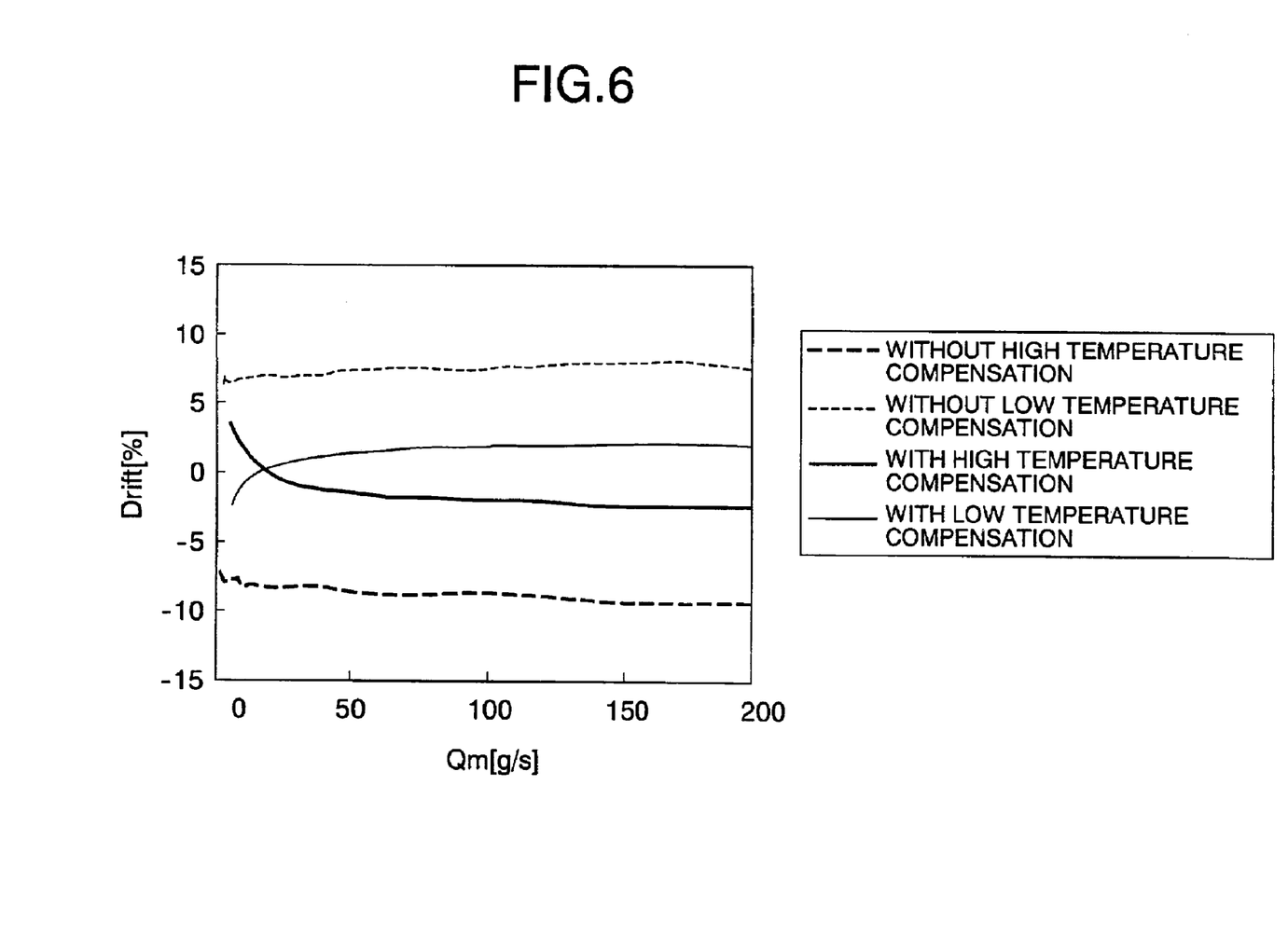
FIG. 6 is a graphical representation showing temperature characteristics of the thermal type flow rate detector according to the second embodiment of the present invention.

FIG. 6 is a graphical representation showing a comparison in temperature drift characteristics between the case where there is no compensation (the circuit configuration shown in FIG. 1) and the case where there is the compensation (the circuit configuration in FIG. 5).

In FIG. 6, the axis of abscissa represents the flow rate (Qm), and then-axis of ordinate represents the rate of change (temperature drift) of the flow rate characteristics when the fluid temperature is high (+80 degrees) and when the fluid temperature is low (−30 degrees) with the flow rate characteristics when the fluid temperature is 23 degrees as the reference. From the figure, it is understood that the temperature drift with the circuit configuration having the temperature compensation given thereto is smaller both at a high temperature and at a low temperature than that with the circuit configuration having no temperature compensation.

Note that, in FIG. 5, the fixed resistor 7 is connected in series with the downstream side heat generating element 4, and the voltage developed across the output terminal 15 and the second constant voltage power supply 14 is used as the flow rate signal. However, in the case as well where the fixed resistor is connected in series with the upstream side heat generating element 3, and the voltage developed across the output terminal 15 and the first constant voltage power supply 16 is used as the flow rate signal, the same temperature compensation can be realized.

According to the second embodiment, the fixed resistor 7 is connected in series with the heat generating elements 3 and 4, whereby it is possible to change the temperature dependency of the voltage developed across the first constant voltage power supply 16 and the output side of the differential amplifier 10 or the voltage developed across the second constant voltage power supply 14 and the output side of the differential amplifier 10. Accordingly, it is possible to compensate for an error in the flow rate detection due to the change in fluid temperature.

Third Embodiment

Figure 7:
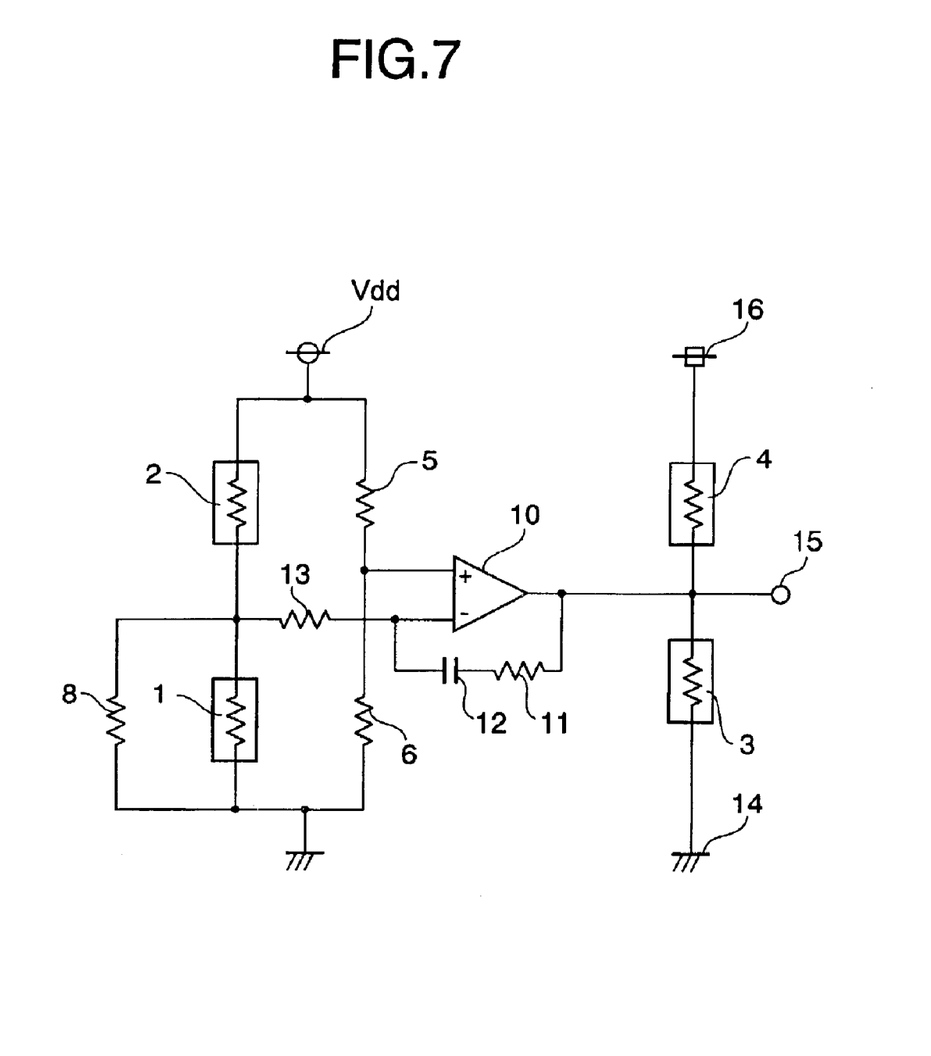
FIG. 7 is a circuit diagram showing a configuration of a thermal type flow rate detector according to a third embodiment of the present invention.

A thermal type flow rate detector according to a third embodiment of the present invention will hereinbelow be described with reference to FIG. 7. FIG. 7 is a circuit diagram showing a configuration of a thermal type flow rate detector according to a third embodiment of the present invention.

In FIG. 7, the circuit configuration is the same as that of the above-mentioned first embodiment shown in FIG. 1 except for a fixed resistor 8, and is given a temperature compensation method different from that of the above-mentioned second embodiment.

In this embodiment, the fixed resistor B is connected in parallel with the temperature detecting element 1, whereby in order to compensate for the outward reduction of the temperature coefficient of the upstream side temperature detecting element 1, the upstream side temperature detecting element 1 is operated so as to be largely changed for the fluid temperature than the downstream side temperature detecting element 2.

For example, when the fluid is at a high temperature, the upstream side temperature detecting element 1 becomes higher in temperature than the downstream side temperature detecting element 2, and the upstream side heat generating element 3 becomes higher in temperature than the downstream side heat generating element 4 accordingly. Therefore, the upstream side heat generating element 3 requires a larger quantity of calorification than the downstream side heat generating element 4 to thereby increase the voltage appearing at the output terminal 15.

On the other hand, when the fluid is at a low temperature, oppositely to the above-mentioned operation, the voltage appearing at the output terminal 15 is reduced. Accordingly, the resistance value of the fixed resistor 8 is suitably adjusted, whereby similarly to the above-mentioned second embodiment, the temperature drift can be reduced. Then, the detector shows the same temperature characteristics as those of the detector having the compensation shown in FIG. 6.

Note that, in FIG. 7, the fixed resistor 8 is connected in parallel with the upstream side temperature detecting element 1. However, even in the case where the fixed resistor 8 is connected in series with the upstream side temperature detecting element 1, the detector shows the same operation as that of the foregoing for the change in fluid temperature to allow the same effects to be provided. Moreover, even in the case where the fixed resistor is connected either in parallel or in series with the downstream side temperature detecting element 2, the same effects can be provided.

According to the third embodiment, the fixed resistor 8 is connected either in parallel or in series with the temperature detecting element 1 or 2, whereby it is possible to change the fluid temperature dependency of the temperatures provided by the heat generation of the upstream side heat generating element 3 and the downstream side heat generating element 4. Thus, it is possible to compensate for an error in flow rate detection due to the change in fluid temperature.

As set forth hereinabove, according to each of the above-mentioned embodiments, with a circuit configuration which is more greatly simplified as compared with a conventional one, a flow direction can also be identified, and a flow rate signal of an analog voltage is obtained which is excellent in SN ratio.

In addition, according to each of the above-mentioned embodiments, the arrangement of the temperature detecting elements and the heat generating elements constituting the flow rate detecting elements is devised, whereby the flow rate sensitivity is improved and hence the flow rate can be detected over a wide flow rate range with high accuracy.

Moreover, according to the above-mentioned second and third embodiments, even when the fluid temperature is changed, the temperature drift is suppressed and hence the flow rate can be detected with high accuracy.

While the present invention has been particularly shown and described with reference to the preferred embodiments and the specific modifications thereof, it will be understood that the various changes and other modifications will occur to those skilled in the art without departing from the scope and true spirit of the invention. The scope of the invention is, therefore, to be determined solely by the appended claims.

What is claimed is:

1. A thermal type flow rate detector, comprising:
   a bridge circuit comprising first and second temperature detecting elements for detecting a temperature of fluid flowing from the upstream side to the downstream side, and first and second fixed resistors; and
   a temperature difference controlling circuit for continuously supplying an electric power to first and second heat generating elements so that a temperature difference between the first and second temperature detecting elements becomes a predetermined value,
   the temperature difference controlling circuit comprising:
   a differential amplifier connected to the bridge circuit;
   a first constant voltage power supply;
   a second constant voltage power supply having a lower constant voltage than that of the first constant voltage power supply; and
   the first and second heat generating elements,
   wherein the first heat generating element is connected between an output side of the differential amplifier and the second constant voltage power supply, and the second heat generating element is connected between the output side of the differential amplifier and the first constant voltage power supply.

2. A thermal type flow rate detector according to claim 1, wherein the temperature difference controlling circuit further comprises a third fixed resistor connected in series with one of the first and second heat generating elements.

3. A thermal type flow rate detector according to claim 1, wherein the bridge circuit further comprises a fourth fixed resistor connected by one of parallel and series connections with one of the first and second temperature detecting elements.

4. A thermal type flow rate detector according to claim 1, wherein the first temperature detecting element is located on the upstream side with respect to the second temperature detecting element;
   the first heat generating element is located on the upstream side with respect to the second heat generating element; and
   the first temperature detecting element is located on the upstream side with respect to the first heat generating element.

5. A thermal type flow rate detector according to claim 2, wherein the first temperature detecting element is located on the upstream side with respect to the second temperature detecting element;
   the first heat generating element is located on the upstream side with respect to the second heat generating element; and
   the first temperature detecting element is located on the upstream side with respect to the first heat generating element.

6. A thermal type flow rate detector according to claim 3, wherein the first temperature detecting element is located on the upstream side with respect to the second temperature detecting element;

the first heat generating element is located on the upstream side with respect to the second heat generating element; and the first temperature detecting element is located on the upstream side with respect to the first heat generating element.

* * * * *